United States Patent
Nakanishi

(10) Patent No.: US 7,339,624 B2
(45) Date of Patent: Mar. 4, 2008

(54) CAMERA-EQUIPPED RECORDING/REPRODUCING APPARATUS

(75) Inventor: Yutaka Nakanishi, Machida (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 764 days.

(21) Appl. No.: 10/659,276

(22) Filed: Sep. 11, 2003

(65) Prior Publication Data

US 2004/0051811 A1   Mar. 18, 2004

(30) Foreign Application Priority Data

Sep. 13, 2002   (JP) .............................. 2002-267959

(51) Int. Cl.
*H04N 5/225* (2006.01)
(52) U.S. Cl. ...................... 348/376; 348/373; 348/374; 348/375
(58) Field of Classification Search ........ 348/373–376, 348/333, 211.2; 386/117–118, 1; 360/85, 360/93
See application file for complete search history.

(56) References Cited

U.S. PATENT DOCUMENTS

| | | | | |
|---|---|---|---|---|
| 5,381,179 A | * | 1/1995 | Kashimura | 348/376 |
| 5,442,453 A | * | 8/1995 | Takagi et al. | 386/118 |
| 5,982,429 A | * | 11/1999 | Kamamoto et al. | 348/333.06 |
| 6,115,069 A | * | 9/2000 | Kuroki et al. | 348/375 |
| 6,226,448 B1 | * | 5/2001 | Takagi et al. | 386/118 |

FOREIGN PATENT DOCUMENTS

JP          07-226871          8/1995

* cited by examiner

*Primary Examiner*—David Ometz
*Assistant Examiner*—Tuan Le
(74) *Attorney, Agent, or Firm*—Jacobson Holman PLLC

(57) ABSTRACT

A camera-equipped recording/reproducing apparatus is equipped with a lens assembly having a lens group and a body having a first side face and a second side face opposite to the first side face when viewed from an object to be photographed. The body is provided in series with and behind the lens assembly in a direction of an optical axis of the lens group when viewed from the object. A monitor screen is provided on the first side face of the body. A grip is provided on the second side face of the body. The grip houses a recording/reproducing unit. The grip is rotatable about an axis almost orthogonal to the optical axis.

8 Claims, 10 Drawing Sheets

CAMERA-EQUIPPED RECORDING/REPRODUCING APPARATUS

BACKGROUND OF THE INVENTION

The present invention relates to a camera-equipped recording/reproducing apparatus. Particularly, this invention relates to a camera-equipped recording/reproducing apparatus equipped with a liquid crystal monitor.

Known camera-equipped video tape recorders (VTR) or camcorders are equipped with a VTR as a recording/reproducing apparatus provided as almost parallel to a camera unit in a camera-lens optical-axis direction.

More advanced camera-equipped VTRs are equipped with a liquid crystal monitor built in a grip for supporting a VTR body. The grip is rotatable so that users can take images at an appropriate wrist position. Such a camera-equipped VTR is disclosed in Japanese Unexamined Patent Publication No. 7-226871 (1995).

In these known camera-equipped VTRs, however, an appropriate wrist angle does not necessarily match an observing angle at which a user views an object via a liquid crystal monitor, within several photographing angles including a normal photographing angle. Moreover, users suffer from wrist ache even at a normal photographing angle, so that long photographing is a hard works. In addition, it is impossible in the known camera-equipped VTRs to photograph the user himself or herself while he or she is doing monitoring via a liquid crystal monitor.

Furthermore, a lens assembly and a heavy VTR are arranged in parallel in the optical axis direction in the known camera-equipped VTRs. This results in that the center of gravity of a heavy VTR body is far from the user's wrist while he or she is holding a grip. Such a far center of gravity causes a large rotational moment applied to the user's wrist so that he or she is easily tired. It is thus hard for the user to hold the camera-equipped VTR for a long time.

The lens assembly and VTR may be arranged in series so that the center of gravity of the VTR body and the grip or user's wrist are close to each other in the direction of optical axis to lighten a rotational moment. Such arrangement, however, results in that the grip is located near the end section of the VTR body with difficulty in handling.

The grip may be located at almost the center of the VTR body. This arrangement, however, results in a large rotational moment about the axis lying in right and left directions with respect to the optical axis, thus long photographing is hard.

SUMMARY OF THE INVENTION

A purpose of the present invention is to provide a camera-equipped recording/reproducing apparatus capable of long photographing at several angles with less tiredness to users.

The present invention provides a camera-equipped recording/reproducing apparatus including: a lens assembly having a lens group; a body having a first side face and a second side face opposite to the first side face when viewed from an object to be photographed, the body being provided in series with and behind the lens assembly in a direction of an optical axis of the lens group when viewed from the object; a monitor screen provided on the first side face of the body; and a grip provided on the second side face of the body, the grip housing a recording/reproducing unit, the grip being rotatable about an axis almost orthogonal to the optical axis.

DETAILED DESCRIPTION OF THE EMBODIMENT

Figure 1A:
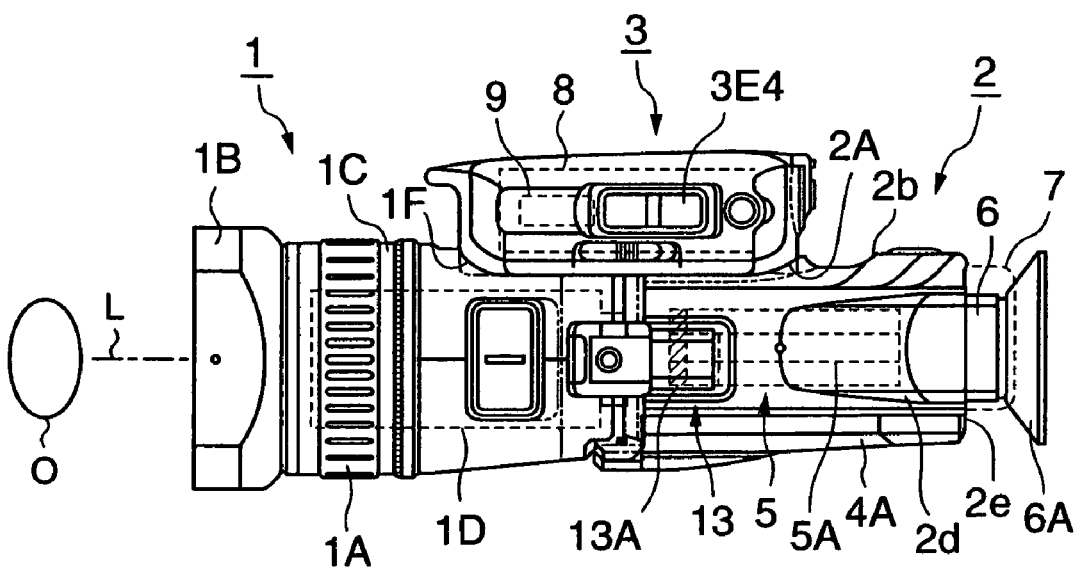
FIGS. 1A and 1B are plan views showing an embodiment of a camera-equipped recording/reproducing apparatus according to the present invention.

A preferred embodiment according to the present invention will be disclosed with reference to the attached drawings.

As shown in FIGS. 1A to 6, an embodiment of a camera-equipped recording/reproducing apparatus according to the present invention mainly consists of a lens assembly 1, a body 2, a grip 3, and a liquid crystal monitor 4.

The lens assembly 1 houses a lens group 1D of several lenses through which light from an object O to be photographed passes.

The body 2 houses a camera unit 13 having an imaging device 13A that converts light passing through the lens group 1D into an electrical signal, and a control unit 5 having a circuit board 5A for overall control of the camera-equipped recording/reproducing apparatus. The camera unit 13 and the control unit 5 are aligned in the body 2 behind the lens assembly 1 when viewed from the object O.

The grip 3 is rotatably provided at a left side face 2b of the body 2 when viewed from the object O. It houses a recording/reproducing unit 8.

The liquid crystal monitor 4 is provided at a right side face 2c of the body 2 when viewed from the object O. It houses a liquid crystal display device (LED).

Figure 1B:
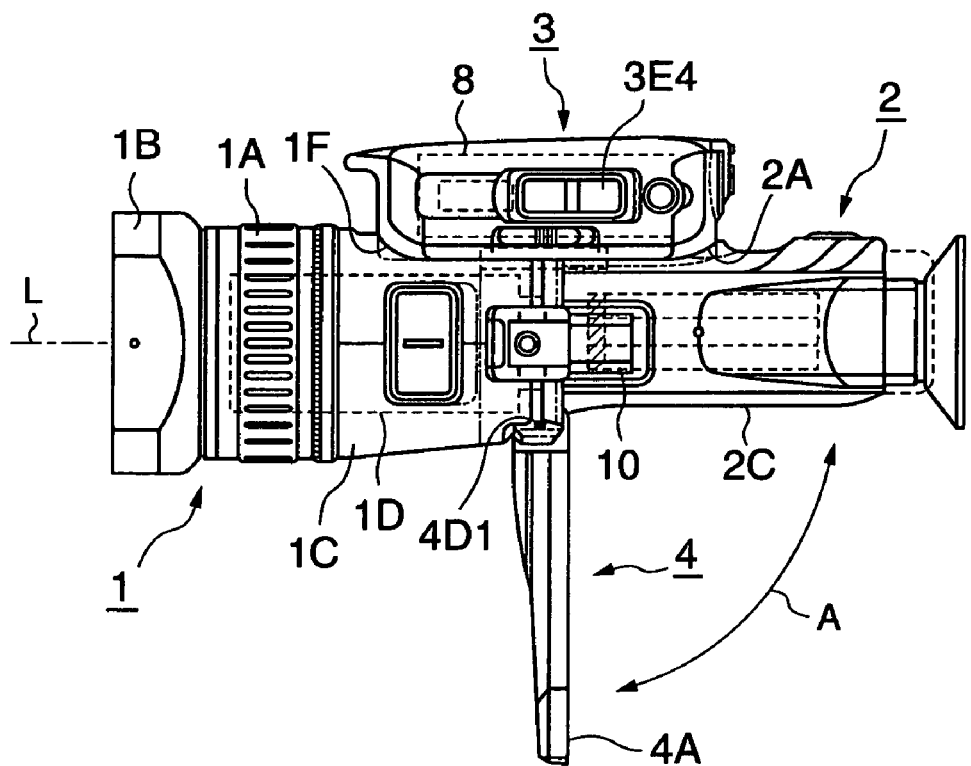
Figure 2:
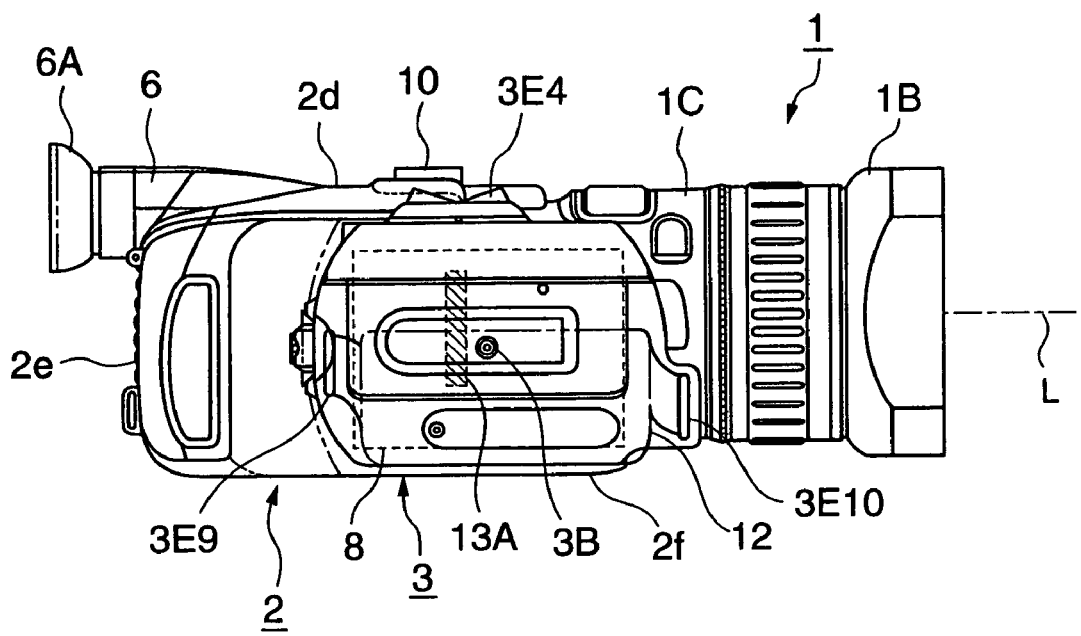
FIG. 2 is a left side view showing the embodiment of the camera-equipped recording/reproducing apparatus according to the present invention.
Figure 3:
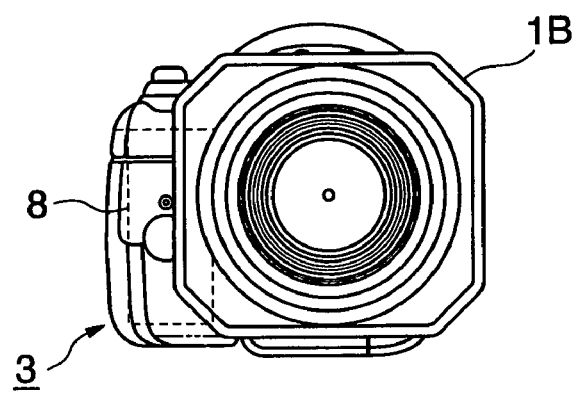
FIG. 3 is a front view showing the embodiment of the camera-equipped recording/reproducing apparatus according to the present invention.
Figure 5A:
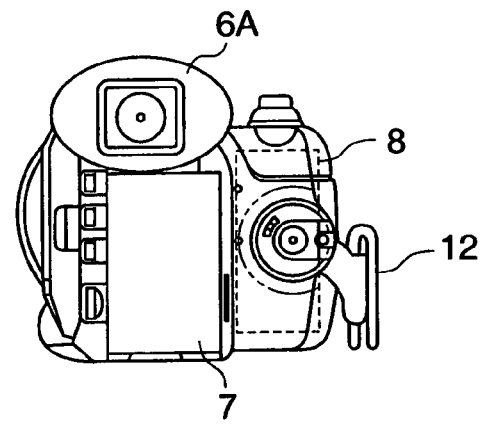
FIGS. 5A and 5B are rear views showing the embodiment of the camera-equipped recording/reproducing apparatus according to the present invention.
Figure 5B:
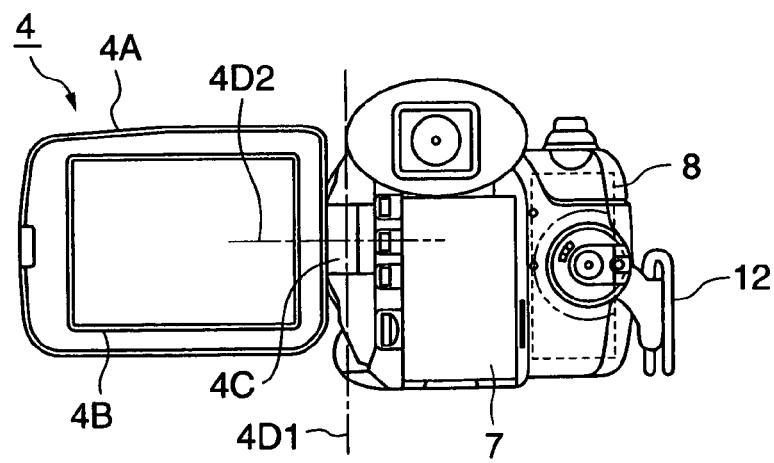

The liquid crystal monitor 4 is swingable within a range of angle as indicated by an arrow A in FIG. 1B. FIGS. 1A and 5A illustrate that the monitor 4 is closed whereas FIGS. 1B and 5B illustrate that it is opened.

Disclosed next are major components of the embodiment of the camera-equipped recording/reproducing apparatus according to the present invention.

(1) Lens Assembly 1

The lens assembly 1 is an electric zoom lens having a lens cylinder 1C that houses the lens group 1D having an optical axis L, as shown in FIGS. 1A and 1B.

The magnifying power of the lens assembly 1 can be varied by pushing an electric zoom button 3E4 which will be disclosed later. Or, it can be varied by rotating a zoom ring 1A provided around the lens assembly 1.

A detachable hood 1B is attached to the front section of the lens assembly 1. A concave section 1F is formed on a side face of the body 2 at the left side of the lens assembly 1 when viewed from the object O in plan views in FIGS. 1A and 1B. The concave section 1F is formed so that it continues to another concave section 2A formed on the body 2.

(2) Body 2

The body 2 is box-type housing that houses the camera unit 13 having the imaging device 13A that receives light passing through the lens group 1D, and the control unit 5 having the circuit board 5A.

Mounted on a top plate 2d at a rear face 2e side is a view finder 6 having an eye cap 6A at its end section.

The body 2 has a rigid metallic chassis (not shown) therein having an accessory shoe 10 mounted at the front section of the top plate 2d for attaching a microphone unit, a carrying handle, etc.

Figure 6:
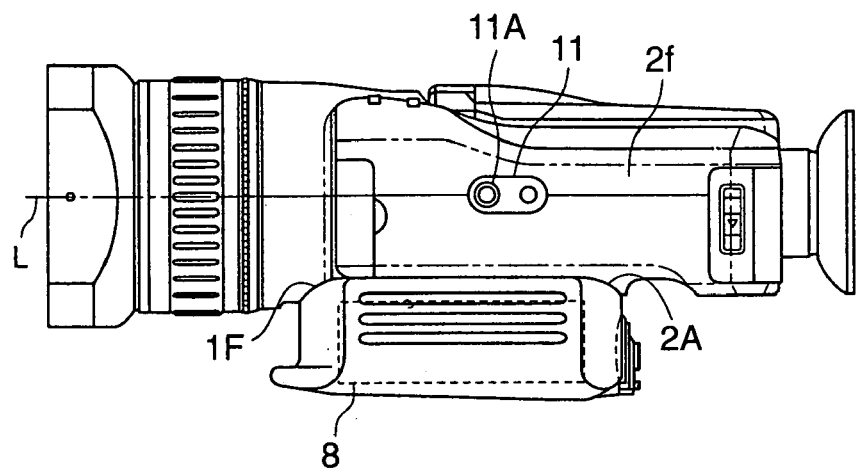
FIG. 6 is a bottom view showing the embodiment of the camera-equipped recording/reproducing apparatus according to the present invention.

Fixed on a bottom surface 2f of the body 2 is a tripod base 11 having a female screw formed thereon, as shown in FIG. 6.

Figure 4:
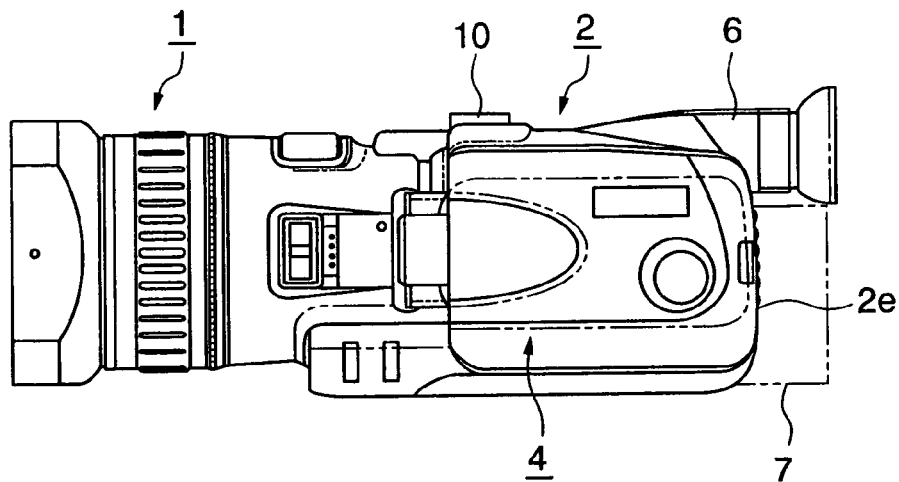
FIG. 4 is a right side view showing the embodiment of the camera-equipped recording/reproducing apparatus according to the present invention.

Mounted on the rear face 2e of the body 2 is a detachable battery 7, as indicated by a two-point chain line in FIG. 4.

The concave section 2A is formed on a left side face 2b of the body 2 when viewed from the object O in the plan views in FIGS. 1A and 1B. The grip 3 is attached to the body 2 so that it is fit in the concave sections 1F and 2A.

(3) Grip 3

As indicated by a dot line in FIG. 1A, the grip 3 houses the recording/reproducing unit 8 for recording/reproducing video signals to/from a storage medium 9.

Figure 7:
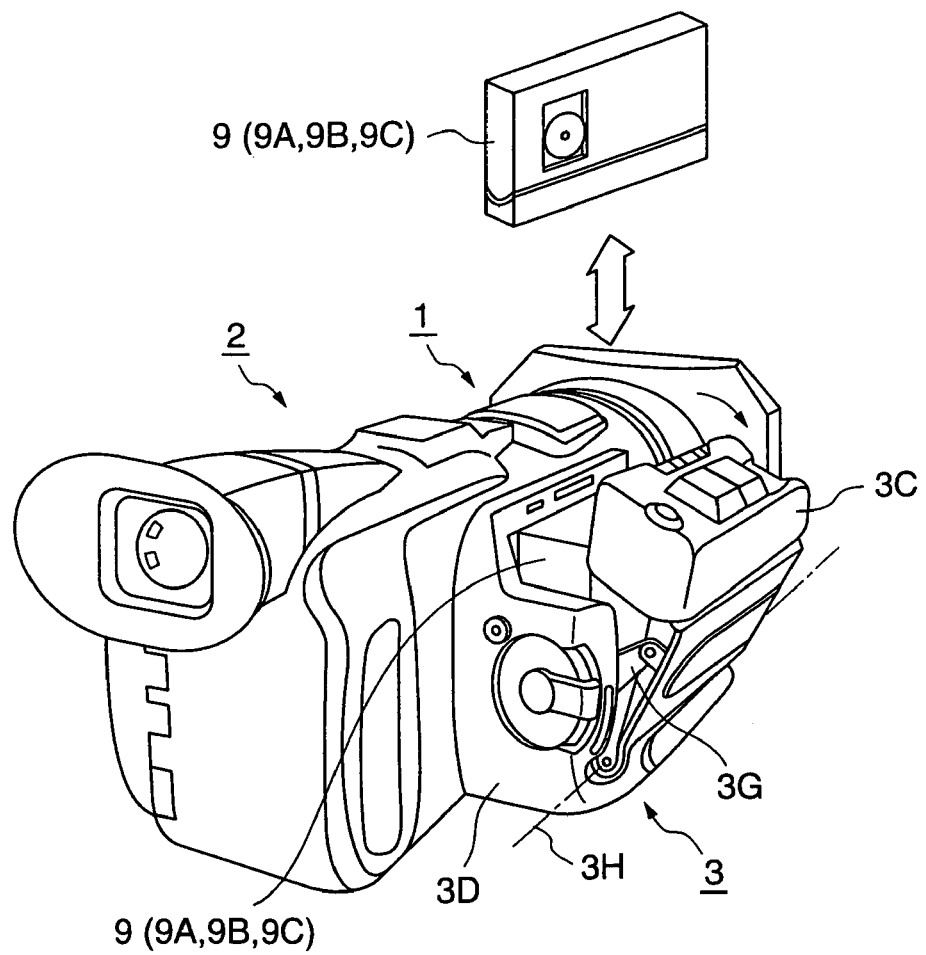
FIG. 7 is a perspective view illustrating loading and unloading a storage medium into and from the embodiment of the camera-equipped recording/reproducing apparatus according to the present invention.

The storage medium 9 shown in FIG. 1A and also FIG. 7 may be a cassette tape 9A, a disc 9B or a solid state memory 9C. The recording/reproducing unit 8 requires at least a rotary head and a tape loading mechanism (both not shown) when the cassette tape 9A is used.

The grip 3 is rotatable about a rotary axis 3B (FIG. 2) within a specific angle range in relation to the body 2. The axis 3B is almost perpendicular to the optical axis L. Moreover, the grip 3 can be locked at any position within the specific angle range.

The rotary axis 3B is pivot about a bearing (not shown) provided on the body chassis to sustain the mass of the camera-equipped recording/reproducing apparatus while the user is holding the grip 3.

The grip rotary mechanism described above is based on a slide mechanism that produces few noises and holds each component with the help of friction.

Figure 12A:
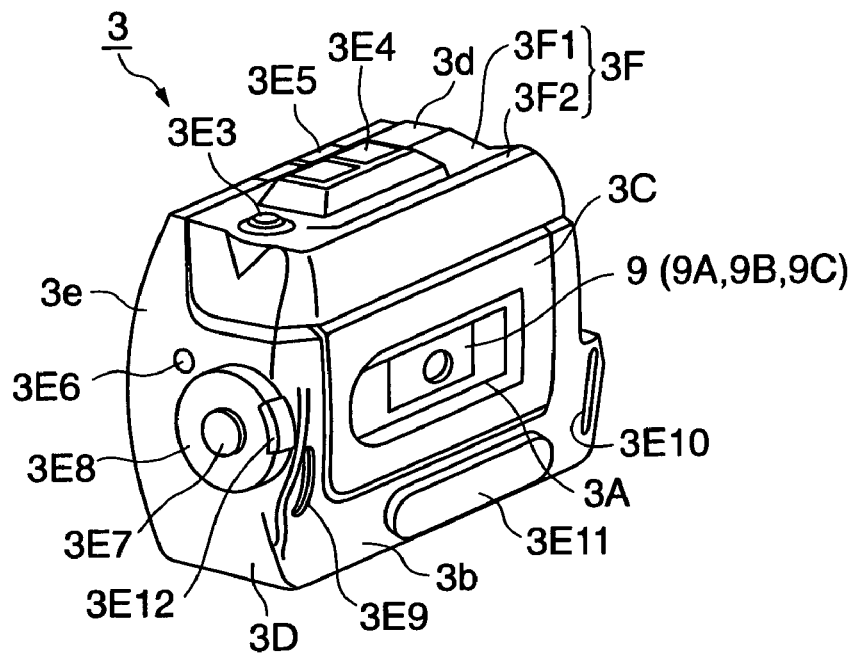
FIGS. 12A and 12B are perspective views illustrating a grip in the embodiment of the camera-equipped recording/reproducing apparatus according to the present invention.
Figure 12B:
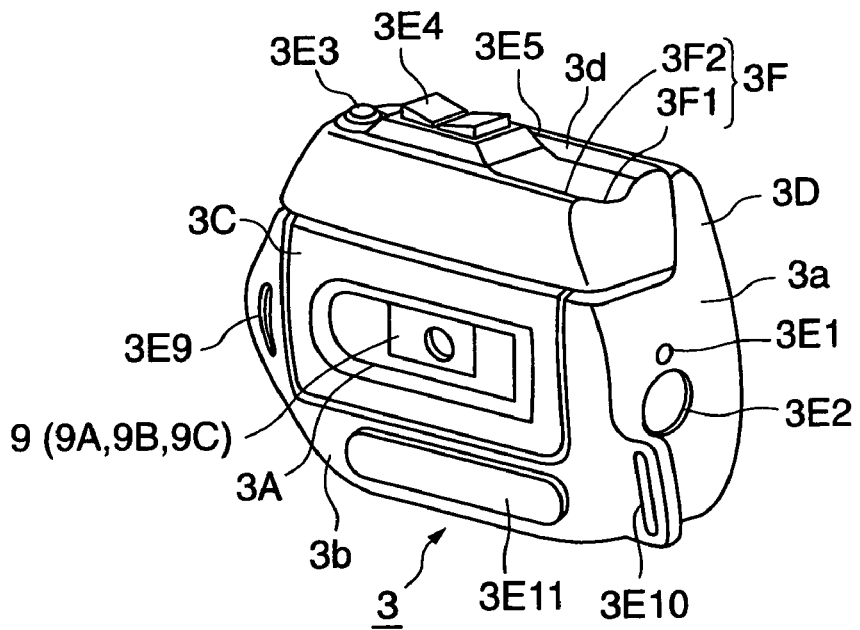

The appearance of the grip 3 is illustrated in FIGS. 12A and 12B when viewed from rear left side and front left side, respectively, of the body 2, when viewed from the object O (FIGS. 1A and 1B).

Provided on an almost center of a side face 3b of the grip 3 is a window 3A through which it is visually checked whether the storage medium 9 has been loaded into the recording/reproducing unit 8. The tape travel condition can also be checked through the window 3A when the cassette tape 9A is used.

The grip body consists of an openable cover 3C and a fixed cover 3D. The openable cover 3C consists of a portion of the side face 3b, a top plate 3d, a front face 3a and a portion of a rear face 3e. The openable cover 3C is indicated by hatching.

The covers 3C and 3D are made of a magnesium alloy for light weight and against deformation which could otherwise occur when held tight. There are several appropriate cover materials. The metallic cover material, however, is the best choice for strength.

Provided on the front of the top plate 3d of the openable cover 3C is a hook 3F by which user's fingers can be hooked while he or she is holding the grip 3. The hook 3F consists of a concave section 3F1 and a convex section 3F2.

Figure 9:
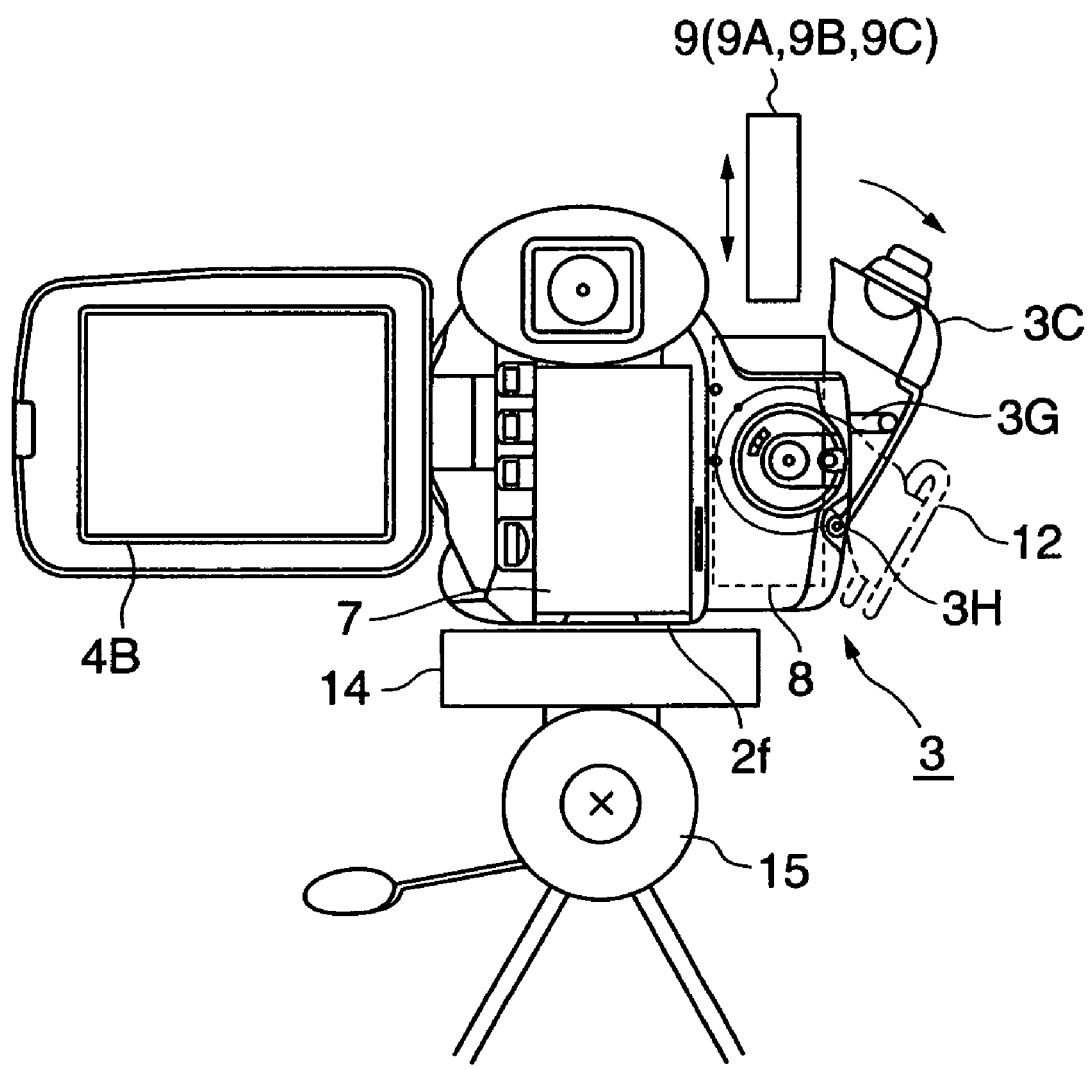
FIG. 9 is a rear view illustrating loading and unloading a storage medium into and from the embodiment of the camera-equipped recording/reproducing apparatus according to the present invention.

The openable cover 3C can be opened by a specific angle, as indicated by an arrow shown in FIG. 9, about a rotary axis 3H under the side face 3b in the direction of optical axis L. The top plate 3d of the grip 3 is opened when the cover 3C is opened so that the storage medium 9 can be loaded or unloaded from above.

Provided on the grip 3 (FIGS. 12A and 12B) are several switches, knobs, displays, etc., for several types of function control.

In detail, provided on the front face 3a are a tally lamp 3E1 and a window 3E2 for receiving light from a remote controller (not shown).

Provided on the top plate 3d are a still-image switching button 3E3, a seesaw electric zoom button 3E4, and a slide knob 3E5 for opening the cover 3C.

Provided on the rear face 3e are a power-on display LED 3E6, a start/stop switch 3E7, a main-function switch 3E8, a grip-belt fixing opening 3E9, and a lock/release lever 3E12 for locking the grip 3 or releasing it from being locked so that it can be rotate.

Provided on the side face 3b are the window 3A already described and a grip-belt folding opening 3E10 via which a grip belt can be folded. Further provided on the side face 3b is an azimuth adjusting opening (not shown) which is covered by a cap 3E11.

Figure 8:
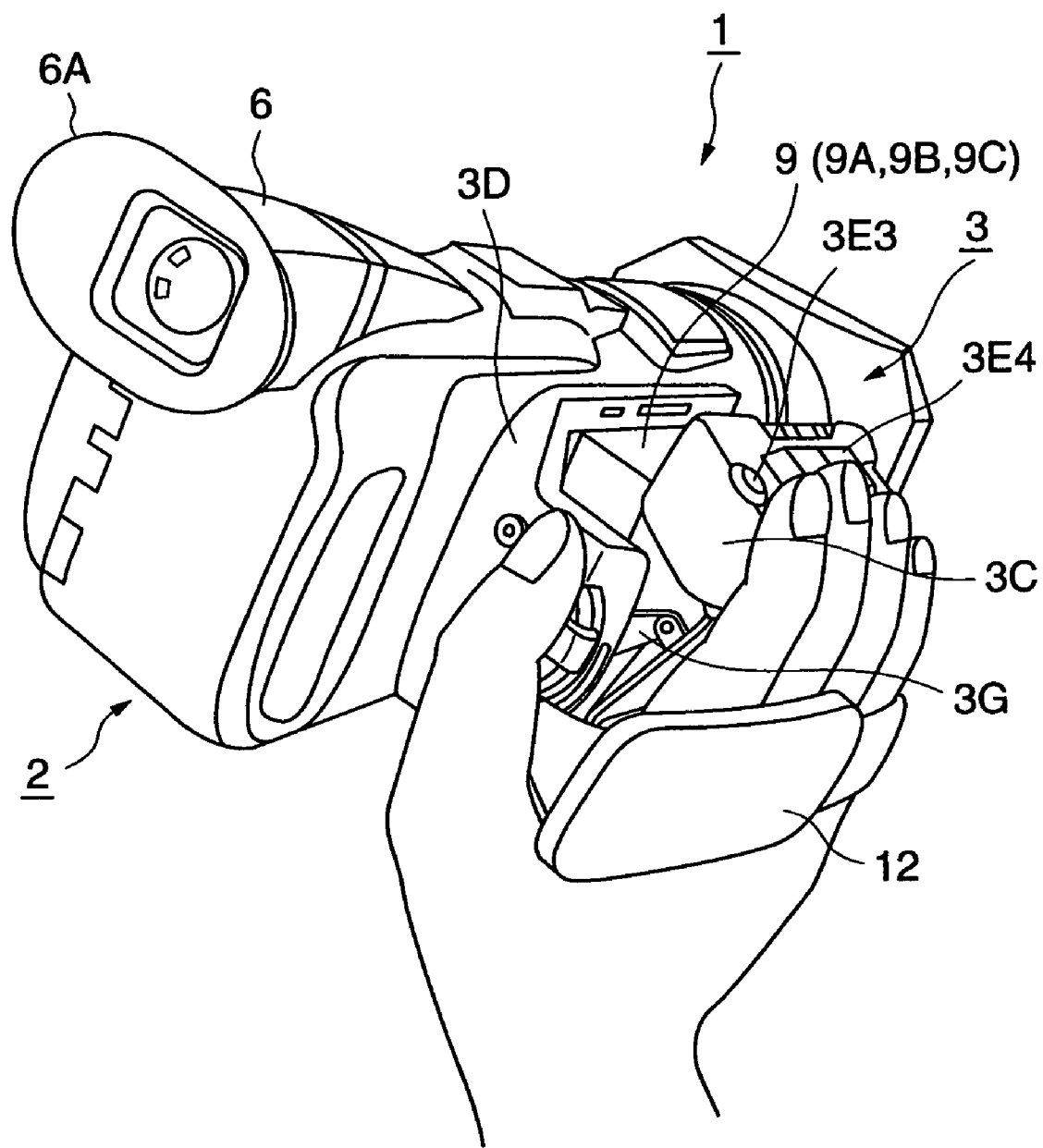
FIG. 8 is another perspective view illustrating loading and unloading a storage medium into and from the embodiment of the camera-equipped recording/reproducing apparatus according to the present invention.

As illustrated in FIG. 8, the switches and knobs disclosed above are arranged on the grip 3 so that a user can touch them naturally with his or her fingers when he or she holds the grip 3.

In detail, the still-image switching button 3E3 and the electric zoom button 3E4 are located at specific positions on the grip 3 so that the user can touch them with his or her index finger and middle finger, respectively, at appropriate angles. The start/stop switch 3E7, the main-function switch 3E8, and the lock/release lever 3E12 are located at specific positions on the grip 3 so that the user can touch them with his or her thumb at appropriate angles.

Several types of switch, knob and display, other than those disclosed above, can be provided on the grip 3.

A grip belt 12 is laid across the grip 3 such that its one end is fit in the grip-belt fixing opening 3E9 and the other end thereof fit in the grip-belt folding opening 3E10, as shown in FIGS. 2, 5A, 5B and 8. The back of the user's hand is moderately squeezed by the grip belt 12 when the user holds the grip 3 so that he or she can manipulate those switches and knobs without pulling out his or her hand from the belt 12 for stable photographing.

(4) Liquid Crystal Monitor 4

As illustrated in FIG. 5B, the liquid crystal monitor 4 consists of a monitor case 4A, a liquid crystal display 4B, and a hinge 4C. The hinge 4C is coupled to the body chassis (not shown) to allow the liquid crystal monitor 4 to move as follows:

The liquid crystal monitor 4 swings and stays at any position within an about 90-degree range about a vertical axis 4D1 that is orthogonal to the optical axis L. The swingable range is indicated by the arrow A in FIG. 1B.

It also swings and stays at any upward position within an about 90-degree range and also any downward position within an about 90-degree range. In other words, it swings and stays at any position within an about 180 degree range about a horizontal axis 4D2 that is orthogonal to the optical axis L.

As disclosed, the liquid crystal monitor 4 is completely independent from the grip 3 so that the liquid crystal display 4B can be held in any direction within the range described above irrespective of the grip 3.

This mechanism allows long photographing with less tiredness at several angles.

Disclosed next are several functions of the camera-equipped recording/reproducing apparatus according to the present invention.

(A) Rotary Operation of Grip 3 (Referring to FIGS. 1A, 1B, 10A, 10B, 10C and 11)

The grip 3 in the embodiment is provided as rotatable for photographing at several angles.

Figure 10A:
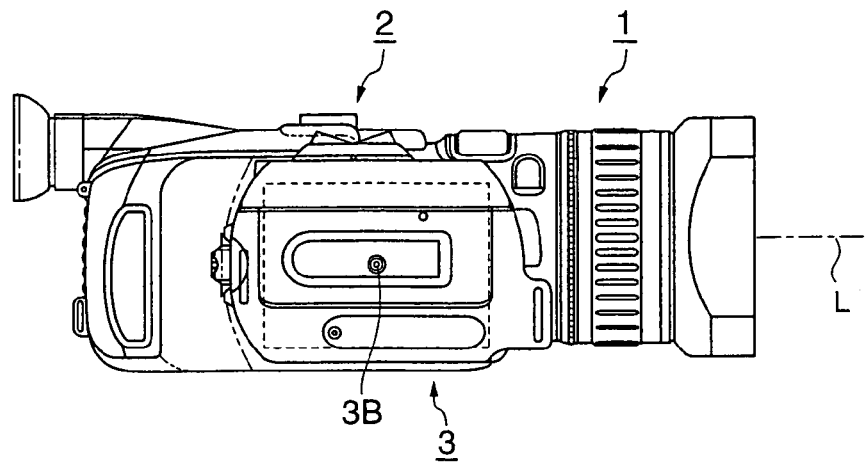
FIGS. 10A, 10B and 10C are side views illustrating rotation of a grip in the embodiment of the camera-equipped recording/reproducing apparatus according to the present invention.

In detail, the liquid crystal monitor 4 is opened by about 90 degrees while the grip 3 is set at horizontal (a normal position) with respect to the optical axis L, as illustrated in FIG. 10A. The monitor 4 is not shown in FIGS. 10A, 10B and 10C.

Figure 10B:
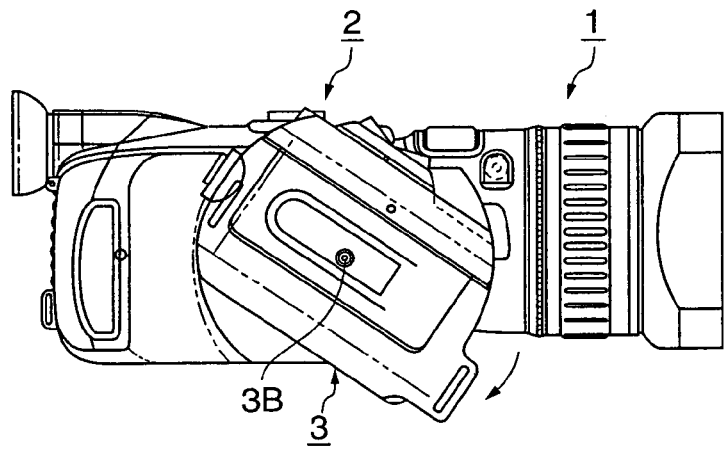

In low-angle photographing, the liquid crystal monitor 4 is tilted upwards while the grip 3 is rotated clockwise by any angle (a low-angle position), as illustrated in FIG. 10B.

Such normal or low-angle positioning allows the user to hold the recording/reproducing apparatus while keeping his or her elbow in without turning his or her wrist anticlockwise, for stable photographing.

In high-angle photographing, the liquid crystal monitor 4 is tilted downwards while the grip 3 is rotated anticlockwise by any angle (a high-angle position).

Even if the grip 3 is at the normal position, high-angle photographing is possible by stretching the user's arm without turning his or her wrist.

Therefore, the minimum requirement for the grip 3 in this embodiment is that it is rotatable at least clockwise in relation to the normal position.

Figure 10C:
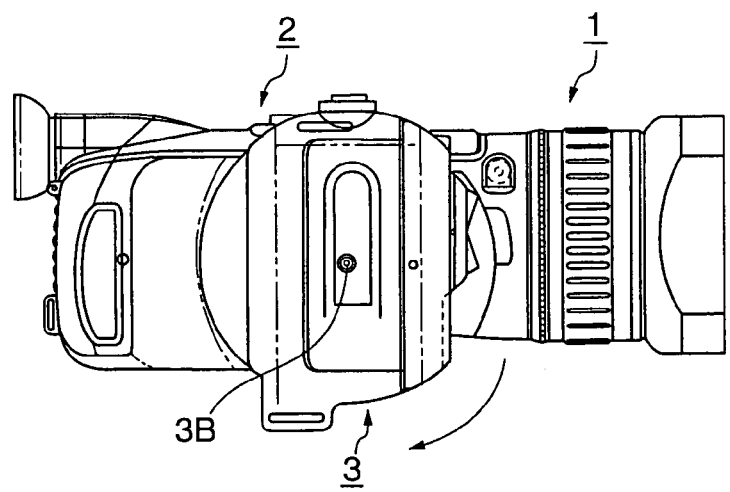

The grip 3 in this embodiment is rotatable clockwise and also anticlockwise by 90 degrees at maximum. FIG. 10C illustrates that the grip 3 has been rotated clockwise by 90 degrees. It may, however, be rotatable by any angle more or less than 90 degrees. The rotatable angle range depends on the shape of the apparatus body, environments, etc.

Figure 11:
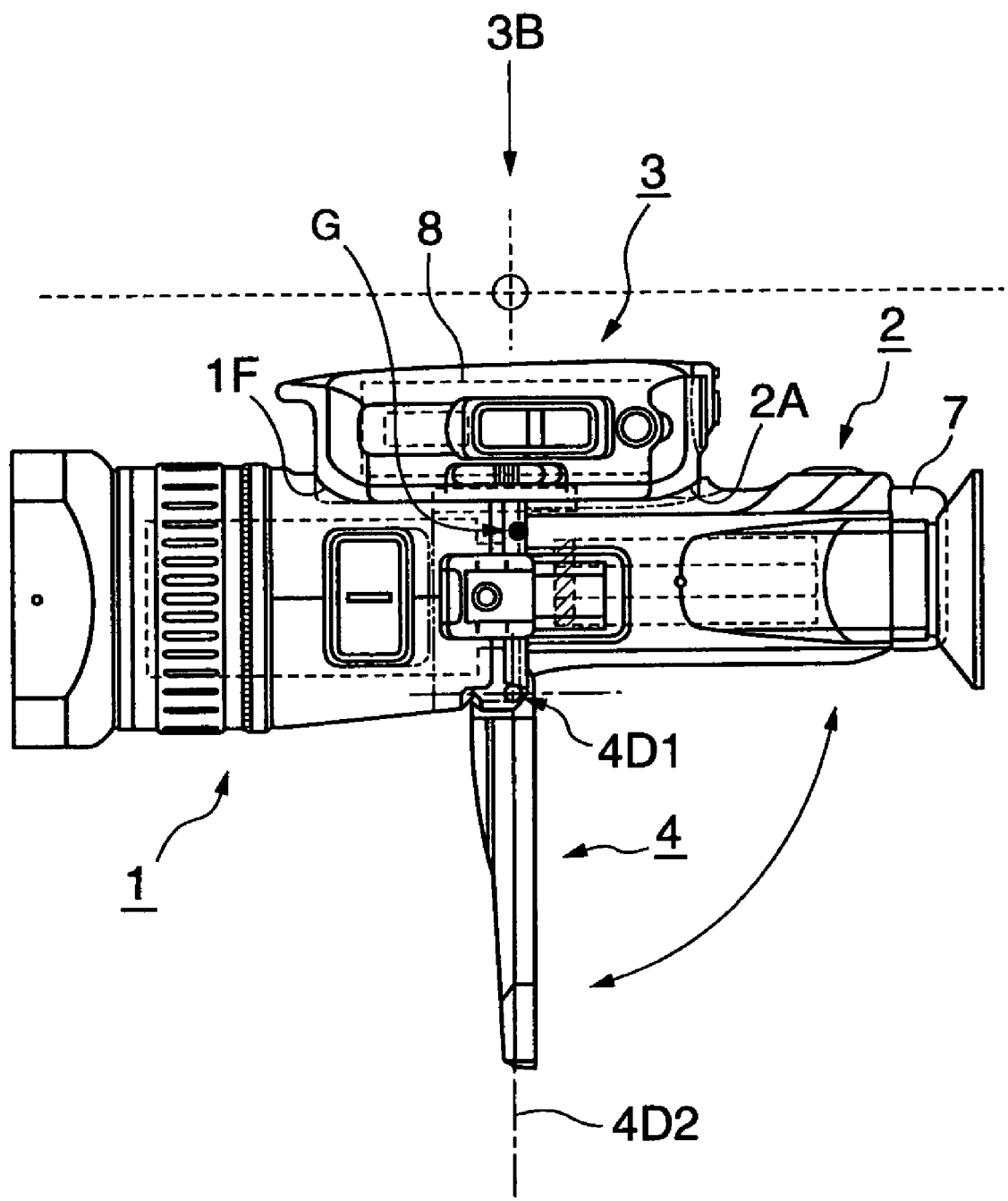
FIG. 11 is a plan view illustrating the center of gravity in the embodiment of the camera-equipped recording/reproducing apparatus according to the present invention.

As illustrated in FIG. 11, a rotary axis 3B about which the grip 3 rotates almost matches the center of gravity G of the camera-equipped recording/reproducing apparatus (equipped with the battery 7) in the longitudinal direction of the apparatus while the liquid crystal monitor 4 is opened.

This is achieved by housing the heavy recording/reproducing unit 8 in the grip 3. The arrangement produces a least rotational moment about axis 3B, which is applied to the user's wrist when he or she holds the grip 3, thus allowing long photographing with less tiredness.

Other arrangements made in this embodiment for long photographing with less tiredness are as follows:

The rotary axes 4D1 and 4D2 (FIG. 5B) of the liquid crystal monitor 4 agree with each other in the longitudinal direction of the apparatus.

This arrangement applies the least load to the user's wrist when he or she holds the grip 3, irrespective of which direction the liquid crystal monitor 4 is set.

The lens assembly 1 and the body 2 are arranged in series in the direction of optical axis. In addition, the heavy recording/reproducing unit 8 is housed in the grip.

These arrangements produce a least rotational moment to be applied to the user's wrist when he or she holds the grip 3, thus allowing long photographing with less tiredness.

The grip 3 is fit in the space formed by the concave section 1F and the concave section 2A both provided on the lens assembly 1 and the body 2.

This arrangement achieves that the user's wrist and the center of gravity G are close to each other when he or she holds the grip 3, thus allowing long photographing with less tiredness.

As disclosed, the present invention produces almost no rotational moment about the axis in the transversal direction of the body 2 and an extremely small moment about the axis in the longitudinal direction of the body 2, both applied to the user's wrist when he or she holds the grip 3. Thus, present invention allows long photographing with extremely less tiredness.

These effects become large as the mass of the recording/reproducing unit 8 becomes large. Therefore, the present invention is applicable, especially, to camera-equipped recording/reproducing apparatus having a heavy recording/reproducing unit with a cassette tape, such as, DVC (Digital Video Camera) cassette tape.

(B) Storage Medium Loading and Unloading (Referring to FIGS. 5A, 5B, 7, 8 and 9)

As, disclosed, the cover 3C of the grip 3 can be opened by a specific angle, as indicated by the arrow shown in FIG. 9, about the axis 3H provided under the side face 3b in the direction of optical axis. The top plate 3d of the grip 3 is opened when the cover 3C is opened so that the storage medium 9 can be loaded from or unloaded towards above, as illustrated in FIG. 7.

The openable cover 3C having the top plate 3d is made of a magnesium alloy, as already described. This openable cover 3C is coupled to the fixed cover 3D with a stay 3G. Thus, almost no force is applied to the axis 3H while the cover 3C is opened, so that the body 2 can be sustained even if the user holds the cover 3C only.

The grip-belt fixing opening 3E9 and the grip-belt folding opening 3E10 are provided on both ends of the grip 3, as illustrated in FIGS. 12A and 12B. This arrangement keeps a stable positional relationship between the grip belt 12 and the user's hand inserted between the belt 12 and the cover 3C even though he or she rotates the grip 3. Thus, the back of the user's hand is moderately squeezed by the grip belt 12 always in a same condition.

Therefore, the user can load or unload the storage medium 9 while holding the grip 3, or without pulling out his or her hand from the grip belt 12, no matter how the grip 3 has been rotated, as illustrated in FIG. 8.

These arrangements allow the user to replace the storage medium 9 with a new one without changing photographing angles or his or her hand holding the grip 3, thus enabling smooth photographing without missing photographing timing.

As illustrated in FIG. 9, the cover 1C can be opened or closed within an area above a bottom surface 2f of the body 2. Therefore, the storage medium 9 can be loaded or unloaded while the camera-equipped recording/reproducing apparatus is fixed on a camera platform 14 of a tripod 15 or placed on a table, etc., without detaching it from the platform 14 or laying it down on the table, if the grip 3 is in the normal position, as illustrated in FIG. 10A.

The alignment of the major components of the embodiment is explained with reference to FIGS. 13A and 13B, schematic plan views showing a positional relationship among the lens assembly 1, the body 2, and the grip 3.

One of the features of this embodiment is that the lens assembly 1 and the body 2 are aligned in series in the direction of optical axis, with the grip 3 that houses the recording/reproducing unit 8 being fit in the concave sections 1F and 2A formed on the side faces of the lens assembly 1 and the body 2, respectively.

Thus, the grip 3 is located over the lens assembly 1 and the body 2 in the optical axis direction.

This alignment allows that the rotary axis 3B of the grip 3 and the center of gravity G of the recording/reproducing unit 8 are close to or almost agree with each other.

The lens assembly 1 can be detached from the body 2 in lens replacement, etc., in this embodiment.

One modification to this invention is, however, that the lens assembly 1 is undetachable from the body 2.

Figure 13A:
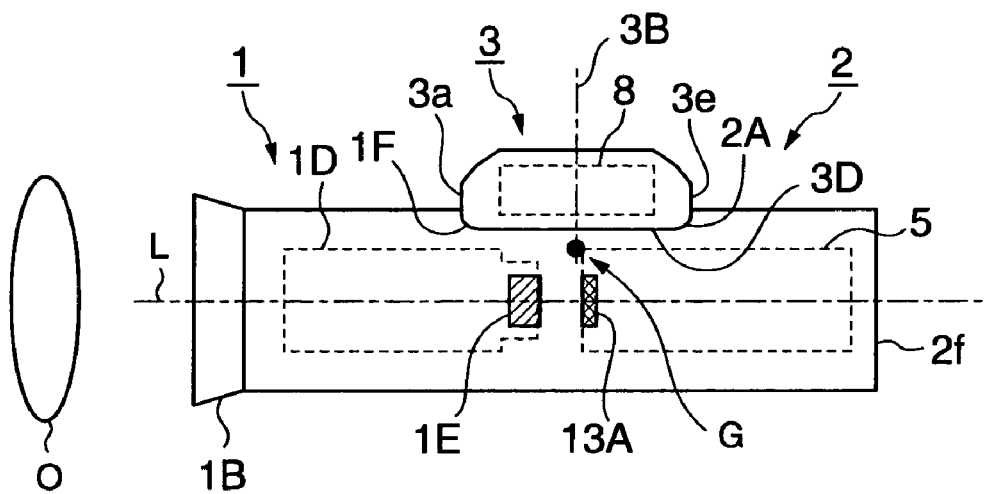
FIGS. 13A and 13B are plan views illustrating a schematic structure of the embodiment of the camera-equipped recording/reproducing apparatus according to the present invention.

As shown in FIG. 13A, the requirements for this modification are as follows:

The front face 3a of the grip 3 is positioned so that it is closer to the object O than the rearmost end of a lens 1E is. The lens 1E is the rearmost lens of the lens group ID housed in the lens assembly 1 when viewed from the object O.

In addition, the rear face 3e of the grip 3 is positioned so that it is closer to a rear face 2f of the body 2 than the front end of the imaging device 13A is.

Figure 13B:
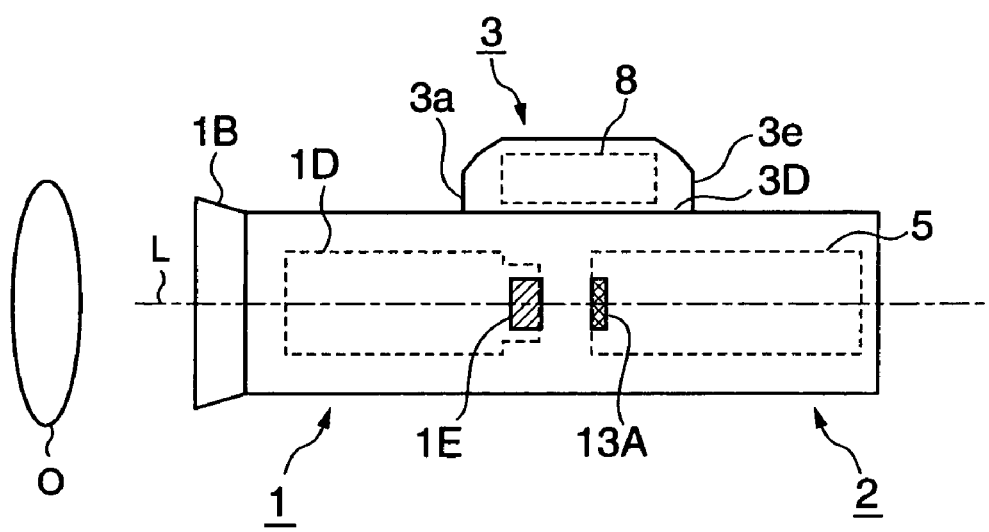

Another modification to this invention is that, as shown in FIG. 13B, the grip 3 is rotatably attached to the body 2 with no concave sections 1F and 2A being formed.

Nevertheless, the embodiment disclosed above and the former modification (FIG. 13A) are more feasible than the latter modification (FIG. 13B). In other words, the arrangement, in which the grip 3 is rotatably fit in the concave sections 1F and 2A, makes the user's hand closer to the center of gravity G than the latter modification. This produces a smaller rotational moment about the optical axis L, which is applied to the user's wrist.

Another feature of the embodiment is that the recording/reproducing unit 8 is housed in the grip 3 having the fixed cover 3D, the grip 3 being a housing separated from the body 2.

This arrangement offers the following advantages:

In recording, noises produced by the recording/reproducing unit 8 are hardly recorded via a microphone attached to the accessory shoe 10, thus recorded audio quality being improved.

The metallic fixed cover 3D, a part of the grip 3, located between the circuit board 5A and the recording/reproducing unit 8, secures high shield effects to reduce noises, thus improving audio and video qualities.

Separation of the circuit board 5A and the recording/reproducing unit 8 provides enhanced heat dissipation to each component, thus restricting temperature rise. This results in long product cycle and high reliability.

Housing the recording/reproducing unit 8 not in the body 2 but the grip 3 allows the body 2 having a comparatively light weight. Instead, this allows the lens assembly 1 to have a comparatively heavy weight. Thus, the lens assembly 1 can be made as having a high zoom ratio, bright lenses with a large-aperture lens, etc.

As disclosed above, the camera-equipped recording/reproducing apparatus according to the present invention is equipped with a lens assembly having a lens group and a body having a first side face and a second side face opposite to the first side face when viewed from an object to be photographed. The body is provided in series with and behind the lens assembly in a direction of an optical axis of the lens group when viewed from the object. A monitor screen is provided on the first side face of the body. A grip is provided on the second side face of the body, housing a recording/reproducing unit. The grip is rotatable about an axis almost orthogonal to the optical axis.

These arrangements produce a very small rotational moment to be applied to the user's wrist when he or she holds the grip. Therefore, the present invention allows long photographing at several angles with less tiredness.

The body can house at least an imaging device. The grip has a specific width and a specific length longer than the width. The grip has a first end and an opposite second end both lying on the length. The first end is closer to the object than the second end is. The lens group has an end close to the object. When the grip is rotated so that the length lies in the direction of the optical axis, the first end of the grip is positioned so that the first end is closer to the object than the end of the lens group is and the second end of the grip is positioned so that the second end is distant from the object than the imaging device is.

These arrangements make the rotary axis of the grip be close to or almost agree with the center of gravity of the camera-equipped recording/reproducing apparatus. Therefore, the rotational moment to be applied to the user's wrist becomes very small when he or she holds the grip, which allows long photographing with less tiredness.

The grip is fit in a concave section formed over the side faces of the lens assembly and the body, as rotatable in the concave section.

The arrangement makes the rotary axis of the grip be closer to or almost agree with the center of gravity of the camera-equipped recording/reproducing apparatus. Therefore, the rotational moment to be applied to the user's wrist becomes very small when he or she holds the grip, which allows long photographing with less tiredness.

Moreover, the grip consists of a fixed cover and an openable cover for housing the recording/reproducing unit. The latter cover can be opened while the user's hand is inserted between a grip belt and this cover so that a storage medium is loaded in or unloaded from the recording/reproducing unit, no matter at which angle the grip has been rotated.

The arrangement allows the user to replace the storage medium with a new one without varying photographing angles or changing the user's hand holding the grip, thus enabling smooth photographing without missing photographing timing.

What is claimed is:

1. A camera-equipped recording/reproducing apparatus comprising:
   a lens assembly having a lens group;
   an imaging device that converts light from the lens assembly into an electrical signal;
   a body having a first side face and a second side face opposite to the first side face when viewed from an object to be photographed, the body being provided in series with and behind the lens assembly in a direction of an optical axis of the lens group when viewed from the object;
   a monitor screen provided on the first side face of the body, the monitor screen being rotatable between a first position in which the monitor screen is closed as facing with the first side face and a second position in which the monitor screen is opened as turning away from the first side face; and
   a grip provided on the second side face of the body, the grip housing a recording/reproducing unit, a storage medium for storing a video signal output by the imaging device being loadable into the recording/reproducing unit, the grip being rotatable about an axis almost orthogonal to the optical axis,
   wherein, when the monitor screen is in the second position, the axis of the grip is almost orthogonal to the optical axis and almost matches the center of gravity of the camera-equipped recording/reproducing apparatus.

2. The camera-equipped recording/reproducing apparatus according to claim 1, wherein the body houses at least the imaging device.

3. The camera-equipped recording/reproducing apparatus according to claim 2, wherein the grip has a specific width and a specific length longer than the width, the grip having a first end and an opposite second end both lying on the length, the first end being closer to the object than the second end being, the lens group having an end close to the object, when the grip is rotated so that the length lies in the direction of the optical axis, the first end of the grip being positioned so that the first end is closer to the object than the end of the lens group is and the second end of the grip being positioned so that the second end is distant from the object than the imaging device is.

4. The camera-equipped recording/reproducing apparatus according to claim 1, wherein the grip is fit in a concave section formed over the lens assembly and the body, the grip being rotatable in the concave section.

5. The camera-equipped recording/reproducing apparatus according to claim 1, wherein the monitor screen is rotatable about a first axis that is orthogonal to the optical axis and about a second axis that is orthogonal to the optical axis, the first and second axes being orthogonal to each other, the first and second axes agreeing with each other in the direction of the optical axis.

6. The camera-equipped recording/reproducing apparatus according to claim 1,
   wherein the grip is made up of a fixed cover and an openable cover for housing the recording/reproducing unit, the grip being provided on the second side face of the body via the fixed cover.

7. The camera-equipped recording/reproducing apparatus according to claim 6, wherein the grip has a specific width and a specific length longer than the width, the grip having a first end and an opposite second end both lying on the length, the grip having a grip belt laid across the grip from the first to second ends, the openable cover being openable while a user's hand is inserted between the grip belt and the openable cover so that a storage medium is loaded in or unloaded from the recording/reproducing unit housed in the grip, irrespective of an angle from the axis almost orthogonal to the optical axis at which the grip has been rotated.

8. The camera-equipped recording/reproducing apparatus according to claim 7, wherein the storage medium is a cassette tape.

* * * * *